May 4, 1937.    R. R. R. SARAZIN    2,079,227
MEANS ADAPTED TO REDUCE THE TORSIONAL OSCILLATIONS OF CRANKSHAFTS

Original Filed July 30, 1931

INVENTOR
R.R.R. Sarazin
BY Townsend + Decker
ATTORNEYS.

Patented May 4, 1937

2,079,227

UNITED STATES PATENT OFFICE 2,079,227

MEANS ADAPTED TO REDUCE THE TORSIONAL OSCILLATIONS OF CRANKSHAFTS

Raoul Roland Raymond Sarazin, Saint-Prix, France

Original application July 30, 1931, Serial No. 554,056. Divided and this application July 13, 1935, Serial No. 31,201. In France December 19, 1930

17 Claims. (Cl. 74—574)

The present application is a division of my copending application Serial No. 554,056 filed July 30th, 1931, wherein is described a means adapted to reduce the torsional oscillations of crank-shafts.

As is well known, the crank-shafts of motors such as Diesel engines, internal combustion motors and the like, having a variable torque in their revolution, display in any sequence of distribution along their length inertias and resiliencies giving rise, at certain velocities of revolution, to torsional resonance speeds due to the harmonics of the driving torques and to the inertia of the pistons and connecting rods.

It is generally sought to eliminate such velocities which are dangerous beyond normal speeds of revolution by increasing as far as possible the resilient rigidity of the shaft whilst reducing its inertia.

This invention aims at providing means adapted to reduce the torsional oscillations of said crank-shafts.

A feature of said means consists of the provision of mobile masses adapted to move at an angle relatively to the shaft of the motor, around which they constitute a kind of fly-wheel having negative inertia relatively to torsional impulses, said masses being so interconnected and connected to the shaft by any suitable means as to ensure permanent balancing of the whole device.

Fly-wheels of this type may be arranged at one or more points intermediate the ends of the shaft of the motor.

Means may be provided to produce, by friction or otherwise, some damping of the angular movements of said masses.

Said masses may likewise be radially movable, so that their centres of gravity may move towards or away from that of the shaft.

In the attached drawing, which shows by way of examples various diagrammatical constructional embodiments of the device according to the invention:

Figure 1:
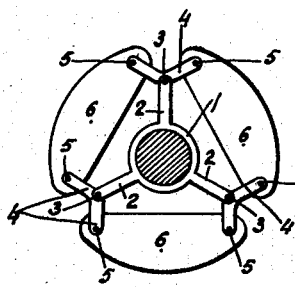
Fig. 1 is a cross-sectional view of an engine crank shaft with my invention, in one embodiment, applied thereto.

A (Fig. 1) is the crank-shaft of a Diesel or other motor.

A sleeve 1 is keyed to said shaft, having three branches at the free end of each of which a small angular connecting rod 4 is hinged at 3, whose two legs are set relatively to each other at an angle of 120°. The parallel legs of two successive angular connecting rods 4 are hinged at 5 to a mass 6 and the device therefore comprises three such masses 6 which constitute a kind of mobile fly-wheel.

The number of connecting rods and masses may, of course, depart from that shown in the drawing.

Upon shaft A revolving, the inertia of masses 6 causes these to move angularly relatively to said shaft, said movements causing the angular connecting-rods 4, whose legs remain always parallel in pairs, to oscillate around their pivotal axes 3. The effect of said movements of masses 6 relatively to shaft A is to counterbalance the inertia inherent to said shaft and to exert upon the same a directional reaction adapted to reduce its torsional oscillations.

The masses 6 act as an inertia means.

It is to be noted that the whole of the device is balanced, whatever may be the positions of masses 6 relatively to shaft A.

The angular movements of masses 6 may be damped by the interposition of suitable frictional members at pivotal axes 3 and 5.

Each connecting-rod leg 4 might, for example, end in a fork 7 (Fig. 2) supporting shaft 5. A muff 8 is fixed upon said shaft or pivot 5 and between the latter muff and a muff 9 wedged into mass 6, a highly compressed india rubber sleeve 10 (of the silent block type, for example) is inserted. Movement of mass 6 at an angle gives rise to friction at its pivotal point, which friction to some extent damps said movement.

Similar provision might be made in regard to hinges 3.

Figure 3:
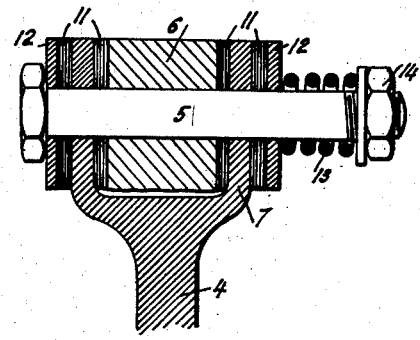
Figures 2, 3 and 4 are detail sectional views longitudinally of a certain pivotal connection and showing three possible constructions thereof

Angular movements of masses 6 might likewise be damped by hinging directly (Fig. 3) each such mass 6 upon its pivotal axis 5 carried by the fork or stirrup-piece 7 and by interposing washers of fibre, wood, asbestos fabric or like suitable material 11 on both sides of said stirrup-piece, between the branches of the same and mass 6, on the one hand, and between said branches and metal washers 12, on the other hand. Washers 11 ensure the damping friction, the extent of which may be adjusted at will, by means of a spring 13 and a nut 14.

Any other known arrangement might of course be used to secure a tight bearing of the fibre or like washers upon stirrup-piece 7 and upon mass 6.

Alternatively, each mass 6 may be made radially mobile relatively to shaft A, so that the distance of the centre of gravity of said mass relatively to the centre of the shaft may vary according to changes of angular speed, said radial movements being limited or damped by any known means, if desired.

Figure 4:
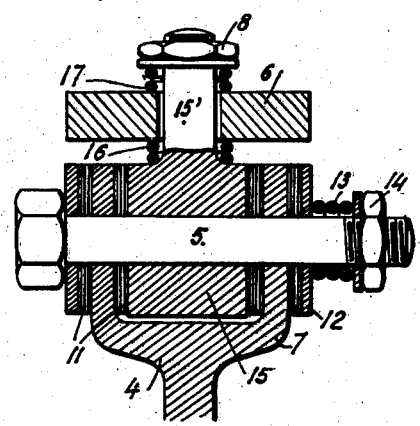

For example, (Fig. 4) one might hinge upon shaft 5, mounted in stirrup-piece 7, a member 15 having an extension 15' along which is adapted to move mass 6 mounted between damping springs 16, 17, whose action may be adjusted by means of a nut 18.

When a sudden variation takes place in the angular velocity of shaft A, each mass 6 tends to move away from the centre of said shaft. A certain degree of absorption of energy by masses 6 results, such energy being restored when the speed of the shaft decreases, the final effect being to tend to correct the amplitude of the oscillations of the latter, which might still obtain.

Figure 2:
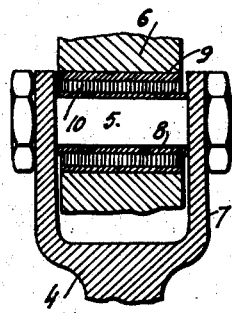

A certain degree of radial displacement of mass 6 is permissible in the constructional embodiment shown in Fig. 2, if the india rubber of muff 10 is left in a condition to permit of slight further compression.

Figure 5:
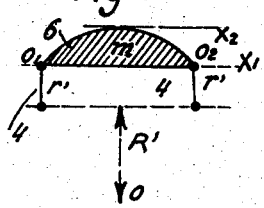
Figure 5 is a diagram explaining graphically the value of the radii of oscillation of the masses.

It has been ascertained that the best results were obtained by giving the radius of each hinged link of the mobile masses, a certain value resulting from the following general formula:

$$\frac{mr'}{p} \times n^2 = 1$$

in which, with reference to Fig. 5 which illustrates diagrammatically the principle of the invention:

$m$ is the mass of one of the mobile masses 6,
$n$ is the harmonic to be compensated,
$r'$ is the radius of each link 4, $$P = \int_{x^1}^{x^1} (R' + x) dm$$

$x$ being the distance from the centre of gravity of mass 6 to line $O_1 O_2$ joining the hinging points of links 4/1 and O the centre of the shaft under consideration.

Should the centre of gravity of the mobile mass be on the straight line $O_1 O_2$, then $$P = mR' \text{ and } \frac{r'}{R'} \times n^2 = 1$$

What I claim is:

1. In a device for reducing torsional vibrations in shafts, a shaft, a plurality of swinging masses, means for interconnecting two consecutive masses, two movable connections between each of said masses and said shaft, the connecting points between the movable connections and the masses moving on prescribed paths.

2. In a device for reducing torsional vibrations in shafts, a shaft, a plurality of swinging masses, means for interconnecting two consecutive masses, two movable connections between each of said masses and said shaft, the connecting points between the movable connections and the masses moving on prescribed paths, and means for damping the swinging of the masses with relation to the shaft.

3. In a device for reducing torsional vibrations in shafts, a shaft, a plurality of swinging masses, dual links each connected to two of said masses, a movable connection between each link and said shaft, two of said links being connected to each mass at spaced points thereof, and means for damping the swinging of the masses with relation to the shaft, the connecting points between the links and the masses moving on prescribed parallel paths.

4. In a device for reducing torsional vibrations in shafts, a shaft, a plurality of swinging masses, dual links at two points of said masses, a member rigid with said shaft, means for connecting each link with said member, and means for damping the swinging of the masses with relation to the shaft.

5. In a device for reducing torsional vibrations in shafts, a shaft, a plurality of swinging masses, dual links at two points of said masses, a member rigid with said shaft, an arm articulated on each link and fitted on said member, and means for damping the swinging of the masses with relation to the shaft.

6. In a device for reducing torsional vibrations in shafts, a shaft, a plurality of swinging masses, dual links at two points of said masses, a member rigid with said shaft, an arm articulated on each link and fitted on said member, means for damping the angular movement of the dual links and arranged at the articulation of each arm on the masses.

7. In a device for reducing torsional vibrations in shafts, a shaft, a plurality of swinging masses, dual links at two points of said masses, a member rigid with said shaft, an arm articulated on each link and fitted on said member, means for damping the angular movement of the dual links and arranged at the articulation of each arm on the masses and damping means at the articulation of the dual link on each arm fitted on said member.

8. In a device for reducing torsional vibrations in shafts, a shaft, a plurality of swinging masses, dual links at two points of said masses, a member rigid with said shaft, an arm articulated on each link and fitted on said member, resilient muffs inserted between each point of the masses and the corresponding arms of the dual links and damping means at the articulation of the dual link on each arm fitted on said member.

9. In a device for reducing torsional vibrations in shafts, a shaft, a plurality of swinging masses, dual links at two points of said masses, a member rigid with said shaft, an arm articulated on each link and fitted on said member, washers of fiber inserted between each of said two points of the masses and corresponding arms of the dual links and damping means at the articulation of the dual link on each arm fitted on said member.

10. In a device for reducing torsional vibrations in shafts, a shaft, a plurality of swinging masses, dual links at two points of said masses, a member rigid with said shaft, an arm articulated on each link and fitted on said member, resilient muffs inserted between each of said two points of the masses and the corresponding arms of the dual links and resilient muffs at the articulation of the dual link on each arm fitted on said member.

11. In a device for reducing vibrations in shafts, a shaft, means for mounting said shaft to rotate about an axis, a member mounted on said shaft for rotation therewith, a mass located on one side of said shaft, and two spaced means operatively connected with spaced points of said mass and with said member for guiding the spaced points of said mass to move along arcuate paths the radii of curvature of which are less than the radii of rotation of said points about the axis of rotation of the shaft, each of said means comprising an element movable with respect both to the member and to the mass and angularly with respect to the axis of said shaft, said means freely retaining said mass against the action of centrifugal force.

12. In a device for reducing vibrations in shafts, a shaft, means for mounting said shaft to rotate about an axis, a member mounted on said shaft for rotation therewith, a mass located on one side of said shaft, and two spaced means for connecting spaced points of said mass to said member for guiding the spaced points of said mass to move along arcuate paths the radii of curvature of which are less than the radii of rotation of said points about the axis of rotation of the shaft, each of said means comprising an element having at least portions thereof shiftable with respect to both said mass and said member in a plane perpendicular to the axis of the shaft, said means freely retaining said mass against the action of centrifugal force.

13. In a device for reducing vibrations in shafts, a shaft, means for mounting said shaft to rotate about an axis, a member mounted on said shaft for rotation therewith, a mass situated on one side of said shaft, two spaced means connecting said mass to said member for freely retaining said mass as a bifilar pendulum suspension against the action of centrifugal effect, each of said means guiding a point of said mass along an arcuate path, the radius of curvature of which is less than the radius of rotation of said point about the axis of rotation of the shaft.

14. A device according to claim 13 in which the spaced means are identical to one another and in parallel relation so that the mass is compelled to remain always parallel to itself relatively to the member fixed to the shaft.

15. A device according to claim 13 in which the spaced means are disposed on either side of a plane passing through the axis of the shaft and the center of gravity of the mass, said means being movable in a plane perpendicular to the axis of the shaft so that the mass is compelled to oscillate in a plane perpendicular to the axis of the shaft.

16. In a device according to claim 13 in which the spaced means are identical to one another and are disposed in parallel relation on either side of a plane passing through the axis of the shaft and the center of gravity of the mass, said means being movable in a plane perpendicular to the axis of the shaft so that the mass is compelled to remain always parallel to itself relatively to the member fixed to the shaft while oscillating in a plane perpendicular to the axis of the shaft.

17. A device according to claim 13 in which the spaced means consist of inextensible links articulated at their inner ends on the member fixed to the shaft and at their outer end on the mass.

RAOUL ROLAND RAYMOND SARAZIN.